(12) United States Patent
Brothers et al.

(10) Patent No.: US 6,561,273 B2
(45) Date of Patent: May 13, 2003

(54) OIL BASED COMPOSITIONS AND METHOD FOR TEMPORARILY SEALING SUBTERRANEAN ZONES

(75) Inventors: Lance E. Brothers, Chichaska, OK (US); Ronald J. Crook, Duncan, OK (US); Anthony V. Palmer, Ardmore, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 21 days.

(21) Appl. No.: 09/884,683

(22) Filed: Jun. 19, 2001

(65) Prior Publication Data

US 2003/0006037 A1 Jan. 9, 2003

(51) Int. Cl.$^7$ .............................................. E21B 33/13
(52) U.S. Cl. ...................... 166/294; 166/300; 507/209; 507/211; 507/215; 507/216; 507/269
(58) Field of Search ................................ 166/292–294, 166/279, 300, 305.1; 507/209, 211, 215, 216, 269

(56) References Cited

U.S. PATENT DOCUMENTS

| | | | |
|---|---|---|---|
| 4,012,328 A | 3/1977 | Hunter et al. | 252/855 R |
| 4,141,843 A | 2/1979 | Watson | 252/8.55 R |
| 4,217,229 A | 8/1980 | Watson | 252/8.55 R |
| 4,337,160 A | 6/1982 | Sample, Jr. | 252/8.5 B |
| 4,502,969 A | 3/1985 | Shell | 252/8.55 R |
| 4,956,104 A * | 9/1990 | Cowan et al. | 507/211 |
| 5,501,277 A | 3/1996 | Onan et al. | 16/293 |
| 5,504,062 A * | 4/1996 | Johnson | 507/212 |
| 5,607,905 A | 3/1997 | Dobson, Jr. et al. | 507/211 |
| 5,680,900 A | 10/1997 | Nguyen et al. | 166/295 |
| 5,711,383 A | 1/1998 | Terry et al. | 175/72 |
| 5,783,527 A | 7/1998 | Dobson, Jr. et al. | 507/269 |
| 5,849,674 A | 12/1998 | Fox et al. | 507/140 |
| 5,911,282 A | 6/1999 | Onan et al. | 175/72 |
| 5,913,364 A | 6/1999 | Sweatman | 166/281 |
| 5,921,319 A | 7/1999 | Curtice | 166/279 |
| 6,060,434 A | 5/2000 | Sweatman et al. | 507/216 |
| 6,131,661 A | 10/2000 | Conner et al. | 166/300 |
| 6,152,227 A | 11/2000 | Lawson et al. | 166/293 |
| 6,167,967 B1 | 1/2001 | Sweatman | 166/281 |

OTHER PUBLICATIONS

SPE/IADC 37671 entitled "New Solution to Remedy Lost Circulation, Crossflows, and Underground Blowouts" by Ronald E. Sweatman; Calvin W. Kessler; John M. Hillier, 1997.
Halliburton brochure entitled "Bentonite Cement Diesel Oil Slurry (BCDO) Lost Circulation Material," dated 2000.
Halliburton brochure entitled "Bentonite Diesel Oil Slurry (BDO) Lost–Circulation Material," dated 2000.
Halliburton brochure entitled "Flo–Chek® Service Lost–Circulation Services," dated 2000.
Halliburton brochure entitled "FlexPlug® OBM Lost–Circulation Material," dated 1999.
Halliburton brochure entitled "FlexPlug W Lost–Circulation Material," dated 1999.
Halliburton brochure entitled "FlexPlug Service Stop Lost Circulation, Hold Your Bottom Line," dated 1998.

* cited by examiner

*Primary Examiner*—David Bagnell
*Assistant Examiner*—Zakiya Walker
(74) *Attorney, Agent, or Firm*—Craig W. Roddy; Todd E. Albanesi

(57) ABSTRACT

The present invention provides oil based compositions and methods of using the compositions for temporarily sealing subterranean zones. The compositions are basically comprised of oil, a hydratable polymer, an organophilic clay, a water-swellable clay, and an acid soluble material such as calcium carbonate. These compositions will form a viscous gel when contacted with water. The gelled mass may then be dissolved with an acidic fluid, such as 15% hydrochloric acid.

39 Claims, No Drawings

OIL BASED COMPOSITIONS AND METHOD FOR TEMPORARILY SEALING SUBTERRANEAN ZONES

BACKGROUND OF THE INVENTION

The present invention relates to improved oil based compositions for temporarily sealing subterranean zones and methods of utilizing the compositions.

In the drilling of oil and gas wells using the rotary drilling method, drilling fluid is circulated through the drill string and drill bit and then back to the surface by way of the well bore being drilled. The drilling fluid maintains hydrostatic pressure on the subterranean zones through which the well bore is drilled and circulates cuttings out of the well bore. During such drilling, subterranean vugs, fractures, and other thief zones are often encountered whereby the drilling fluid circulation is lost, and drilling operations must be terminated while remedial steps are taken. Also, when a subterranean zone is penetrated containing fluids under pressure which exceeds the hydrostatic pressure exerted on the zone by the drilling fluid, formation fluid crossbows and/or underground blow-outs can and often do occur. As a result, drilling fluid circulation is often lost which requires the termination of the drilling and the implementation of remedial procedures which are often of long duration and high cost.

U.S. Pat. No. 6,060,343 issued May 9, 2000 having inventors Ronald E. Sweatman and James F. Heathman and issued to Halliburton Energy Services, Inc. describes oil based compositions and methods of using the compositions for sealing subterranean zones. The compositions are basically comprised of oil, a hydratable polymer, an organophilic clay, and a water-swellable clay. These compositions and methods develop ultra high viscosity in a few seconds or minutes, solving many problems associated with prior art methods and compositions, and have been highly successful for sealing subterranean zones. The specification of U.S. Pat. No. 6,060,343 is incorporated herein by reference in its entirety.

It is sometimes desirable, however, to temporarily seal a subterranean zone. Thus, there is a need for improved compositions and methods for sealing subterranean zones having the benefits and advantages of the compositions disclosed in U.S. Pat. No. 6,060,343 and that would have the additional benefit of temporarily sealing subterranean zones. After having been sealed for the desired well workover activity, it would be desirable to be able to easily and quickly reopen the subterranean zones. It would still be important, however, that such a seal not be easily washed out or removed until it is desired to remove the plug and reopen the zone.

SUMMARY OF THE INVENTION

Improved oil based compositions for temporarily sealing subterranean zones and methods of using the compositions are provided and meet the need described above. The compositions are basically comprised of oil, a hydratable polymer, an organophilic clay, a water-swellable clay, and an acid soluble material. These compositions will form a viscous gel when contacted with water. The gelled mass may then be dissolved with an acidic fluid, such as 15% hydrochloric acid in water. Thus, the temporary seal is not easily washed out or removed until it is desired to remove the plug and reopen the zone The compositions can also include cross-linking agents, dispersing agents, cement, fillers and the like, provided that any such other materials do not adversely affect the desired functions of the compositions according to the invention.

When the temporary sealing compositions of this invention contact water in the well bore, the hydratable polymer reacts with the water, whereby it is hydrated and forms a highly-viscous gel and the water-swellable clay swells, whereby an ultra high viscosity mass is formed. The organophillic clay adds viscosity to the sealing composition when it is formed, i.e., it reacts with the oil carrier fluid and prevents the polymer and water-swellable clay from settling out of the composition.

When the temporary sealing compositions of this invention contact water in the well bore, the hydratable polymer reacts with the water, whereby it is hydrated and forms a highly-viscous gel and the water-swellable clay swells, whereby an ultra high viscosity mass is fanned. The organophilic clay adds viscosity to the sealing composition when it is formed, i.e., it reacts with the oil carrier fluid and prevents the polymer and water-swellable clay from settling out of the composition.

A composition for temporarily sealing a subterranean zone to prevent the uncontrolled flow of fluids into or from the zone preferably comprises: first component comprising oil; the balance of the temporary sealing composition comprising a second component and a third component, wherein the second component comprises: a hydratable polymer, an organophilic clay, and a water-swellable clay; and the third component comprises an inorganic material that is readily acid soluble but substantially insoluble in neutral or basic water; wherein the second component is present in an amount in the range of from about 10% to about 90% by weight of the balance of the temporary sealing composition, and wherein the third component is present in an amount in the range of from about 10% to about 90% by weight of the balance of the temporary sealing composition.

Preferably, the second component comprises: a hydratable polymer present in an amount in the range of from about 4.4% to about 14.6% by weight of the second component; an organophilic clay present in an amount in the range of from about 0.4% to about 1.6% by weight of the second component; and a water-swellable clay present in an amount in the range of from about 84% to about 95% by weight of the second component.

The methods of the invention comprise the steps of preparing a temporary sealing composition of this invention, introducing it into the subterranean zone to be sealed, and subsequently removing the temporary sealing composition by washing with an acidic solution.

It is, therefore, a general object of the present invention to provide improved oil based compositions and methods for temporarily sealing subterranean zones and methods. Other and further objects, features, and advantages of the present invention will be readily apparent to those skilled in the art upon a reading of the description of preferred embodiments which follows.

DESCRIPTION OF PREFERRED EMBODIMENTS

The present invention provides improved oil based compositions for temporarily sealing subterranean zones and terminating the loss of drilling fluid, crossflows, and/or underground blow-outs. When a temporary sealing composition of this invention contacts water in the well bore, it immediately forms a resilient sealing mass having ultra high viscosity. As the sealing mass is displaced through the well bore, it enters and seals thief zones such as vugs and fractures through which fluid is lost. A flexible seal is obtained by a combination of extrusion pressure and friction pressure. When the highly-viscous gelled mass is contacted or washed with an acidic fluid, such as 15% hydrochloric acid, the acid soluble material dissolves, which substantially reduces the viscosity of the gelled mass. The reduced viscosity of the gelled mass allows it to be washed away from the subterranean zone and reopen the zone.

The temporary sealing compositions of this invention are self diverting and plug multiple weak zones in a single well treatment. When a well contains a crossflow or underground blow-out, the high viscosity sealing compositions plug all the lower pressure weak zones penetrated by the well bore, and, as the pressure in the well bore is increased, the crossflow or blow-out zone is plugged. The resultant sealed well bore achieved by the temporary sealing compositions of this invention can hold higher drill-ahead drilling fluid weights and produce a wedging effect in plugged fractures that increases the integrity of the entire formation or zone.

The portion of a temporary sealing composition left in the well bore after sealing one or more zones therein remains movable to divert to other zones above or below the sealed zones. The sealing mass is not readily diluted or washed away by crossflows as are most prior art compositions.

The temporary sealing compositions of the present invention are basically comprised of oil, a hydratable polymer, an organophilic clay, a water-swellable clay, and an acid soluble material. The hydratable polymer reacts with water in the well bore and is immediately hydrated, whereby a highly-viscous gel is formed. The water-swellable clay immediately swells in the presence of water and, together with the viscous gel, forms a highly-viscous sealing mass. The organophilic clay reacts with the oil carrier fluid to add viscosity to the composition so that the polymer and clay do not settle out of the oil prior to reacting with water in the well bore. The acid soluble material is suspended in the viscous sealing mass.

A composition for temporarily sealing a subterranean zone to prevent the uncontrolled flow of fluids into or from the zone preferably comprises: a first component comprising oil, the balance of the temporary sealing composition comprising a second component and a third component, wherein the second component comprises: a hydratable polymer present in an amount in the range of from about 4.4% to about 14.6% by weight of the second component; an organophilic clay present in an amount in the range of from about 0.4% to about 1.6% by weight of the second component; and a water-swellable clay present in an amount in the range of from about 84% to about 95% by weight of the second component; and the third component comprises an inorganic material that is readily acid soluble but substantially insoluble in neutral or basic water; wherein the second component is present in an amount in the range of from about 10% to about 90% by weight of the balance of the temporary sealing composition, and wherein the third component is present in an amount in the range of from about 10% to about 90% by weight of the balance of the temporary sealing composition.

The oil utilized in accordance with this invention can be any oil which does not adversely react with other components of the sealing compositions and reacts with organophilic clays to bring about an increase in the viscosity of the compositions prior to contacting water. The term "oil" is used herein to mean non-aqueous liquids including, for example, diesel oil, mineral oils, kerosene, vegetable oils, synthetic oils, esters, olefins, and the like. Of these, diesel oil is preferred. The oil used is generally included in the sealing compositions of this invention in an amount in the range of from about 32% to about 62% by weight of the temporary sealing compositions. When diesel oil is used, it is preferably included in the temporary sealing compositions in an amount in the range of from about 43% to about 53% of the temporary sealing compositions.

A variety of well known hydratable polymers can be utilized in accordance with the present invention. Generally, they include hydratable polymers which contain one or more of the functional groups such as hydroxyl, cis-hydroxyl, carboxyl, sulfate, sulfonate, amino or amide. Particularly useful such polymers are polysaccharides and derivatives thereof which contain one or more of the monosaccharide units galactose, mannose, glucoside, glucose, xylose, arabinose, fructose, glucuronic acid, or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragacanth and carrageenan. Hydratable synthetic polymers and copolymers which contain the above mentioned functional groups and which have been utilized heretofore include polyacrylate, polymethacrylate, polyacrylamide, maleic anhydride, methylvinyl ether polymers, polyvinyl alcohol, and polyvinylpyrrolidone.

Preferred hydratable polymers for use in accordance with this invention which yield high viscosities upon hydration include one or more of guar gum and guar derivatives such as hydroxypropylguar and carboxymethylguar, cellulose derivatives such as hydroxyethylcellulose carboxymethylcellulose and carboxymethylhydroxyethylcellulose, locust bean gum, carrageenan gum, and xanthan gum. Of these, the most preferred is hydroxyethylcellulose. The hydratable polymer or polymers used are included in the second component in an amount in the range of from about 4.4% to about 14.6% by weight of the second component, more preferably from about 6% to about 12% by weight of the second component.

The viscosities of the polymers when hydrated in water can be increased by combining crosslinking agents with the polymer solutions. Examples of crosslinking agents which can be utilized are multivalent metal salts or compounds which are capable of releasing the metal ions in an aqueous solution. Examples of such multivalent metal ions are chromium, zirconium, antimony, titanium, iron (ferrous or ferric), zinc, or aluminum. When used, a crosslinking agent as described above is included in the second component in an amount in the range of from about 0.05% to about 9% by weight of the second component, more preferably from about 0.05% to about 3% by weight of the second component.

While a variety of organophilic clays can be utilized, an alkyl quaternary ammonium bentonite clay is preferred. A particularly suitable alkyl quaternary ammonium bentonite clay for use in accordance with the present invention is commercially available from Southern Clay Products, Inc. of Gonzales, Tex. under the tradename "CLAYTONE-II.TM." The organophilic clay is generally present in the compositions of this invention in an amount in the range of from about 0.4% to about 1.6% by weight of the second component, more preferably from about 0.6% to about 1.3%.

The water-swellable clay can be one or more clays selected from montmorillonite, attapulgite, Fuller's earth, bentonite, and the like. Of these, bentonite is preferred. The water-swellable clay is present in the sealing compositions in an amount in the range of from about 84% to about 95% by weight of the second component, more preferably about 90%.

The third component of the temporary sealing compositions is an acid soluble material. As used herein, an acid soluble material is a material that is readily soluble in acidic water but insoluble in basic or neutral pH water. Preferably, the acid soluble material is no more than about 1% by weight soluble in de-ionized water when tested at a pH of about 7, a temperature of about 212° F., and a pressure of about 1 atmosphere. As used herein, readily soluble means that at least 1% by weight of the material dissolves in 100 grams of water within less than one minute with stirring. Although there is not a bright line, the difference between acid solubility and solubility in water having a neutral or basic pH is critical to the function of the temporary sealing compositions and the methods of using them for temporarily sealing subterranean zones.

To facilitate carrying or suspending the acid soluble material in the oil based component and to facilitate dissolving the acid soluble material in an acidic solution, the acid soluble material is preferably less than about 40 mesh. More preferably, the acid soluble material is about 200 mesh.

In addition to acid solubility, another important criteria for selecting the acid soluble material is the cost of the material. Preferably, readily available, low-cost materials are used.

Preferably, the acid soluble material is an inorganic carbonate, and more preferably the inorganic acid material is selected from the group consisting of calcium carbonate, magnesium carbonate, barium carbonate, and iron (II) carbonate, or any combination thereof. Most preferably, the acid soluble material is calcium carbonate.

In some temporary sealing compositions according to the invention, the second component can be present in an amount in the range of from about 10% to about 90% by weight of the balance of the temporary sealing composition, and the third component can be present in an amount in the range of from about 10% to about 90% by weight of the balance of the temporary sealing composition. More preferably, the second component is present in an amount in the range of from about 30% to about 70% by weight of the balance of the temporary sealing composition, and the third component is present in an amount in the range of from about 30% to about 70% by weight of the balance of temporary sealing composition. Most applications are expected to work well wherein the second component is present in an amount of about 50% by weight of the balance of the temporary sealing composition, and the third component is present in an amount of about 50% by weight of the balance of the temporary sealing composition.

In order to facilitate the dispersal of the solid materials, i.e., the hydratable polymer, the organophilic clay, the water-swellable clay, and the acid soluble material in the oil carrier fluid used, an effective amount of a dispersing agent can be included in the temporary sealing compositions. Various dispersing surfactants can be utilized including lecithin, aminododecylbenzene sulfonate, aryl alkyl sodium sulfonate, imodazolin, and others. Of these, lecithin is preferred.

Inert fillers can be included in the temporary sealing compositions to increase the downhole yield of the compositions and/or provide additional hardness to the compositions. Examples of such fillers are silica flour, silica fume, pozzolans, and the like. Hardenable hydraulic materials such as Portland cement and slag can also be added to the sealing compositions to alter and/or enhance the properties of the sealing masses formed when the sealing compositions contact water in a well bore.

The temporary sealing compositions can also be foamed with nitrogen or other suitable gas in the presence of a foaming agent for reducing the densities of the compositions, preventing fluid loss and aiding in the diversion of the compositions into zones to be sealed. A suitable foaming agent which can be used is a fluorocarbon surfactant.

Other additives which are well known to those skilled in the art can also be included in the compositions.

The temporary sealing compositions of this invention can be prepared in accordance with any of the well known mixing techniques. In a preferred method, the oil used is second introduced into a blender. The dispersant and other liquid additives are then added followed by the hydratable polymer, organophilic clay, water-swellable clay, acid soluble material, and other dry solids. The mixture is agitated for a sufficient period of time to mix the components and form a pumpable slurry. If convenient, the second component comprising oil, hydroxyelthylcellulose, alkyl quaternary ammonium bentonite clay, and water-swellable bentonite clay is mixed second, which can be used either as a permanent sealing composition as disclosed in U.S. Pat. No. 6,060,343 or as the second component of a temporary sealing composition as disclosed herein.

The methods of this invention for temporarily sealing a subterranean zone to prevent the uncontrolled flow of fluids into or from the zone basically comprise the steps of preparing a subterranean zone temporary sealing composition of this invention comprising oil, a hydratable polymer, an organophilic clay, a water-swellable clay, and an acid soluble material, and then introducing the temporary sealing composition into the zone to be sealed. Generally, the temporary sealing composition is prepared in a mixing apparatus at the surface and then pumped down the well bore into the zone to be sealed at a high pressure, whereby the sealing mass formed in the well bore is squeezed into fractures and vugs therein. A fluid pressure above the fracture gradient of the zone can also be used in some applications to fracture the zone being sealed and force the sealing composition into the fractures, thereby increasing the overall strength of the zone. As mentioned, the temporary sealing composition enters the weakest portions of the zone second followed by other portions including those where fluids crossflow through the well bore or blow-out into the well bore. The temporary sealing composition stops drilling fluid losses and allows high drilling fluid densities to be utilized when needed while drilling ahead. Once the temporary sealing composition has been placed, it increases the fracture gradient to a higher value that can eliminate the need for intermediate casing, drilling liners, and the like. Because the temporary sealing composition readily diverts to other weak zones in the well bore, the integrity of the entire well bore is improved by the temporary sealing composition.

In order to further illustrate the temporary sealing compositions and methods of the present invention, the following examples are given. In general, an oil based temporary sealing composition of the present invention was prepared in the laboratory. A portion of the temporary sealing composition was added to an equal portion of a water based drilling fluid. Within about 10 seconds a solid high-viscosity mass was formed which had a moldable consistency. The high viscosity mass was then readily dissolved within about one minute by washing with an acidic fluid, such as 15 wt % hydrochloric acid in de-ionized water.

EXAMPLES

More particularly, the following illustrative examples are provided:

A first component for use in preparing the illustrative examples of a temporary sealing composition was No. 2 diesel.

A second component for use in preparing the illustrative examples of a temporary sealing composition included the following: 8.4 wt % hydroxyethylcellulose; 0.9 wt % organophilic clay; 90 wt % bentonite clay; and 0.7 wt % zirconium oxychloride.

A third component for use in preparing the illustrative examples of a temporary sealing composition was 200 mesh calcium carbonate.

The first component, No. 2 diesel, comprised 50% by weight of the following illustrative examples of the temporary sealing compositions. The balance of the illustrative examples of the temporary sealing compositions were either 50% by weight of the second component and 50% by weight of the third component or 30% by weight of the second component and 70% by weight of the third component.

Normally, slurry containing the first, second, and third components is prepared with a batch mixer, which helps ensure uniformity and fluid quality, but it can also been mixed on-the-fly. The first component, i.e., the oil, is normally first placed in a batch mixer. The second and third components, being dry material, are then added. The second and third components can be mixed together before adding to the oil or added separately to the oil. To avoid sedimentation after mixing, stir or circulate the mixture at a low rate until the material is pumped.

The temporary sealing compositions were tested for gelation using the representative 9.5 lb/gal muds shown in Table 1.

TABLE 1

| Components | Mud #1 | Mud #2 | Mud #3 | Mud #4 |
| --- | --- | --- | --- | --- |
| Freshwater, bbl | 0.94 | 0.94 | 0.94 | 0.93 |
| Wyoming bentonite clay (Montmorillonite), lb | 15 | 8 | 20 | 25 |
| Oxidized lignite, lb | — | — | 4 | 8 |
| Ferrochrome lignosulfonate, lb | — | — | — | 2 |
| Acrylic acid grafted onto calcium lignosulfonate, lb | — | — | 4 | — |
| Caustic Soda, lb | 0.1 | 0.2 | 1.5 | 2 |
| Lime, lb | — | — | 4 | 0.3 |
| Polyanionic cellulose; actually, carboxymethyl cellulose, lb | — | 0.55 | — | — |
| Acrylamide/acrylic acid copolymer emulsion, lb | — | 0.5 | — | — |
| Potato Starch, lb | 4 | 5 | 4 | — |
| Brazan-D Plus, lb | — | 0.2 | 0.55 | 0.4 |
| Barite; same as Barium Sulfate, lb | 36.8 | 42.45 | 36.8 | 28.74 |
| Rev Dust, lb | 18.2 | 18.2 | 18.2 | 18.2 |

The gelation tests were conducted by mixing equal volumes of the temporary sealing composition with the mud. Tables 2–4 illustrate the gelation results when these illustrative examples of the temporary sealing compositions were tested at 190° F. and ambient temperature with Mud Nos. 1–4.

TABLE 2

190° F. Gelation Test Results
Diesel Oil Carrier with balance of 50% Second Component
and 50% Third Component

| Mud | Results of Mixing with Plug Material |
| --- | --- |
| #1 | Immediate gelation |
| #2 | Immediate gelation |
| #3 | Immediate gelation |
| #4 | Immediate gelation |

TABLE 3

Ambient Temperature Gelation Test Results
Diesel Oil Carrier with 50% Second Component
and 50% Third Component

| Drilling Fluid | Resulting of Mixing with Plug Material |
| --- | --- |
| #1 | Immediate gelation |
| #2 | Immediate gelation |
| #3 | Immediate gelation |
| #4 | Immediate gelation |

TABLE 4

Ambient Temperature Gelation Test Results
Diesel Oil Carrier with 30% Second Component
and 70% Third Component

| Drilling Fluid | Resulting of Mixing with Plug Material |
| --- | --- |
| #3 | Immediate gelation |
| #4 | Immediate Gelation |

Samples of the gelled fluids, approximately 20 cc in volume, were place in 1 liter of 15% hydrochloric acid. In all cases, the calcium carbonate in the gelled material dissolved, and the remaining material dispersed in the acidic solution.

Thus, the present invention is well adapted to carry out the objects and attain the benefits and advantages mentioned as well as those which are inherent therein. While numerous changes to the compositions and methods can be made by those skilled in the art, such changes are encompassed within the spirit of this invention as defined by the appended claims.

What is claimed is:

1. A method of sealing a subterranean zone to prevent the uncontrolled flow of fluids into or from the zone comprising the steps of:

preparing a subterranean zone temporary sealing composition comprising: a first component comprising oil in an amount in the range of about 32% to 62% by weight of the temporary sealing composition, the balance of the temporary sealing composition comprising a second component and a third component, wherein the second component comprises: a hydratable polymer, an organophilic clay, and a water-swellable clay, and the third component comprises an acid soluble material that is readily acid soluble but substantially insoluble in neutral or basic water wherein the third component is no more than about 1% by weight soluble in de-ionized water when tested at a pH of about 7, a temperature of about 212° F., and a pressure of about 1 atmosphere; and wherein the second component is present in an amount in the range of from about 10% to about 90% by weight of the balance of the temporary sealing composition, and wherein the third component is present in an amount in the range of from about 10% to about 90% by weight of the balance of the temporary sealing composition, and introducing the temporary sealing composition into the zone.

2. The method of claim 1 further comprising the step of: introducing an acid fluid into the zone.

3. The method of claim 2 wherein the acid fluid comprises 15% by weight hydrochloric acid in water.

4. The method of claim 1 wherein the third component is selected from the group consisting of calcium carbonate, magnesium carbonate, barium carbonate, and iron (II) carbonate.

5. The method of claim 1 wherein the third component is calcium carbonate.

6. The method of claim 1 wherein the third component has a mesh size of up to about 40.

7. The method of claim 1 wherein the third component has a mesh size of about 200.

8. The method of claim 1 wherein the second component is present in an amount in the range of from about 30% to about 70% by weight of the balance of the temporary sealing composition, and wherein the third component is present in an amount in the range of from about 30% to about 70% by weight of the balance of the temporary sealing composition.

9. The method of claim 1 herein the second component is present in an amount of about 50% by weight of the balance of the temporary sealing composition, and wherein the third component is present in an amount of about 50% by weight of the balance of the temporary sealing composition.

10. The method of claim 1 wherein the oil is selected from the group consisting of diesel oil, mineral oils, kerosene, vegetable oils and synthetic oils, esters, and olefins.

11. The method of claim 1 wherein the oil is diesel oil.

12. The method of claim 1 wherein the hydratable polymer is selected from the group consisting of guar gum, hydroxypropylguar, carboxymethylguar, hydroxyethylcellulose, carboxymethylcellulose, carboxymethylhydroxyethylcellulose, locust bean gum, carrageenan gum, and xanthan gum and is present in an amount in the range of from about 4.4% to about 14.6% by weight of the second component.

13. The method of claim 1 wherein the hydratable polymer is hydroxyethylcellulose and is present in an amount in the range of about 4.4% to about 14.6% by weight of the second component.

14. The method of claim 1 wherein the organophilic clay is an alkyl quaternary ammonium bentonite clay, and is present in an amount in the range of from about 0.4% to about 1.6% by weight of the second component.

15. The method of claim 1 wherein the water-swellable clay is selected from the group consisting of montmorillonite, attapulgite, Fuller's earth, and bentonite and is present in an amount in the range of from about 84% to about 95% by weight of the second component.

16. The method of claim 1 wherein the water-swellable clay is bentonite and is present in an amount in the range of from about 84% to about 95% by weight of the second component.

17. The method of claim 1 wherein the temporary sealing composition further comprises an effective amount of a dispersing agent.

18. The method of claim 17 wherein the dispersing agent is lecithin.

19. A method of sealing a subterranean zone to prevent the uncontrolled flow of fluids into or from the zone comprising the steps of:

preparing a subterranean zone temporary sealing composition consisting essentially of: a first component comprising oil in an amount in the range of about 32% to 62% by weight of the temporary sealing composition, the balance of the temporary sealing composition comprising a second component and a third component, wherein the second component comprises: a hydratable polymer, an organophilic clay, and a water-swellable clay, and the third component comprises an acid soluble material that is readily acid soluble but substantially insoluble in neutral or basic water wherein the third component is no more than about 1% by weight soluble in de-ionized water when tested at a pH of about 7, a temperature of about 212° F., and a pressure of about 1 atmosphere; and wherein the second component is present in an amount in the range of from about 10% to about 90% by weight of the balance of the temporary sealing composition, and wherein the third component is present in an amount in the range of from about 10% to about 90% by weight of the balance of the temporary sealing composition, and introducing the temporary sealing composition into the zone.

20. The method of claim 19 further comprising the step of: introducing an acid fluid into the zone.

21. The method of claim 20 wherein the acid fluid comprises 15% by weight hydrochloric acid in water.

22. The method of claim 19 wherein the third component is selected from the group consisting of calcium carbonate, magnesium carbonate, barium carbonate, and iron (II) carbonate.

23. The method of claim 19 wherein the third component is calcium carbonate.

24. The method of claim 19 wherein the third component has a mesh size of up to about 40.

25. The method of claim 19 wherein the third component has a mesh size of about 200.

26. The method of claim 19 wherein the second component is present in an amount in the range of from about 30% to about 70% by weight of the balance of the temporary sealing composition, and wherein the third component is present in an amount in the range of from about 30% to about 70% by weight of the balance of the temporary sealing composition.

27. The method of claim 19 wherein the second component is present in an amount of about 50% by weight of the balance of the temporary sealing composition, and wherein the third component is present in an amount of about 50% by weight of the balance of the temporary sealing composition.

28. The method of claim 19 wherein the oil is selected from the group consisting of diesel oil, mineral oils, kerosene, vegetable oils and synthetic oils, esters, and olefins.

29. The method of claim 19 wherein the oil is diesel oil.

30. The method of claim 19 wherein the hydratable polymer is selected from the group consisting of guar gum, hydroxypropylguar, carboxymethylguar, hydroxyethylcellulose, carboxymethylcellulose, carboxymethylhydroxyethylcellulose, locust bean gum, carrageenan gum, and xanthan gum and is present in an amount in the range of from about 4.4% to about 14.6% by weight of the second component.

31. The method of claim 19 wherein the hydratable polymer is hydroxyethylcellulose and is present in an amount in the range of about 4.4% to about 14.6% by weight of the second component.

32. The method of claim 19 wherein the organophilic clay is an alkyl quaternary ammonium bentonite clay, and is present in an amount in the range of from about 0.4% to about 1.6% by weight of the second component.

33. The method of claim 19 wherein the water-swellable clay is selected from the group consisting of montmorillonite, attapulgite, Fuller's earth, and bentonite and is present in an amount in the range of from about 84% to about 95% by weight of the second component.

34. The method of claim 19 wherein the water-swellable clay is bentonite and is present in an amount in the range of from about 84% to about 95% by weight of the second component.

35. The method of claim 19 wherein the temporary sealing composition further comprises an effective amount of a dispersing agent.

36. The method of claim 35 wherein the dispersing agent is lecithin.

37. The method of claim 19 wherein the hydratable polymer is present in an amount in the range of from about 4.4% to about 14.6% by weight of the second component.

38. The method of claim 19 wherein the organophilic clay is present in an amount in the range of from about 0.4% to about 1.6% by weight of the second component.

39. The method of claim 19 wherein the water-swellable clay is present in an amount in the range of from about 84% to about 95% by weight of the second component.

* * * * *